United States Patent
Ensley

[15] 3,673,872
[45] July 4, 1972

[54] CRYOGENIC SOUND SUPPORTED INERTIAL REFERENCE

[72] Inventor: Donald L. Ensley, San Leandro, Calif.
[73] Assignee: U.S. Atomic Energy Commission under the provisions of 42 U.S.C. 2182
[22] Filed: Feb. 1, 1966
[21] Appl. No.: 524,044

[52] U.S. Cl. ............................................................. 73/505
[51] Int. Cl. ........................................................ G01p 15/00
[58] Field of Search .......................... 73/505, 504, 516; 74/5

[56] References Cited

UNITED STATES PATENTS 3,164,022   1/1965   Ensley ..................................... 73/505
3,232,120   2/1966   Ensley ..................................... 73/505

Primary Examiner—James J. Gill
Attorney—Roland A. Anderson

[57] ABSTRACT

An inertial reference unit for sensing rotation about selected axes including a piezoelectric body in a cryogenic chamber. The piezoelectric body is provided with a hollow spherical cavity and is of material of low accoustic impedance. A spherical inertial reference element positioned within the hollow cavity has optical assymetry and permits passage therethrough of radiant energy in the light spectrum. The space within the cavity outside the reference element is filled with a transmission medium, such as liquid helium. Means are provided for directing at least one light beam through the walls of the cavity and through the inertial element for sensing rotation of the piezoelectric body relative to the inertial element.

6 Claims, 6 Drawing Figures

PATENTED JUL 4 1972 3,673,872

INVENTOR
DONALD LUTHER ENSLEY

Richards Harris & Hubbard
ATTORNEY

CRYOGENIC SOUND SUPPORTED INERTIAL REFERENCE

This invention relates to an inertial reference unit for sensing rotation about selected axes and more particularly to a rotational inertial reference unit which is resiliently positioned by a convergent ultrasonic field.

In accordance with the disclosures of U.S. Pat. No. 3,164,022 and No. 3,232,120, a solid inertial reference element is placed in a flotation chamber. The flotation chamber is filled with a fluid having a specific gravity of the same order as the specific gravity of the reference element. The reference element is neutrally buoyant in the fluid. Transducers in the chamber, when excited, produce an ultrasonic sound field within the flotation fluid. The reaction of the sound field with the surfaces of the reference element produces standing pressure waves of second order radiation within the flotation chamber. By directing the ultrasonic energy against diametrically opposed surfaces of the inertial element, the inertial element seeks an equilibrium position in the field and will be restrained resiliently at such equilibrium position by reason of the presence of pressure gradients in the sound field adjacent to the surfaces of the element.

In U.S. Pat. No. 3,232,120, a spherical inertial element is resiliently supported in a flotation chamber in an ultrasonic sound field which is convergent. Rotation about each of three mutually perpendicular axes is sensed.

In accordance with the invention, a cryogenic system includes a piezoelectric body having a hollow cavity therein which encloses a spherical reference element in the cavity. A cryogenic fluid fills the space in the cavity outside the element. Means are provided for applying an ultrasonic voltage to the body for generating ultrasonic waves in the cavity which are convergent toward the center to support the element and to impart rotation thereto. Means are provided for sensing the rotation of the body relative to the element about a selected axis.

In a more specific aspect, a piezoelectric body in a cryogenic chamber is provided with a hollow spherical cavity and is of material of low acoustic impedance. A spherical inertial reference element is positioned within the cavity. The element is such as to permit passage therethrough of radiant energy in the light spectrum and is characterized by having optical asymmetry i.e., optically active, so as to rotate the plane of polarization of polarized light passing therethrough. A voltage in the ultrasonic frequency band is applied to the piezoelectric body for generating pressure waves in the spherical cavity which are convergent toward the center of the cavity. A transmission medium, such as He II, confined within the cavity for flotation of the inertial reference element, provides for decoupling the spin of the element from the angular motion of the sound generator and eliminates free convection of the fluid which, if not in a cryogenic chamber, would be deleterious in the presence of thermal gradients in an acceleration field. Means are provided for directing at least one light beam through the walls of the body and through the inertial element for sensing rotation of the body relative to the inertial element.

For a more complete understanding of the present invention, and for further objects and advantages thereof, reference may now be had to the following description taken in conjunction with the accompanying drawings in which:

FIG. 1 is a sectional view of a support system embodying the present invention;

FIG. 2 diagrammatically illustrates the use of a force field for element rotation;

Figure 1:
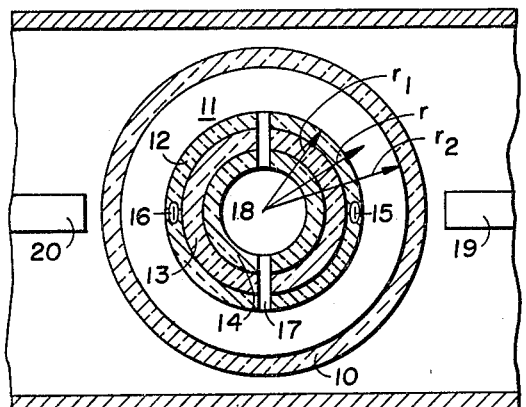

The present invention is closely related to the invention described and claimed in U.S. Pat. No. 3,232,120. However, the present system is an improvement over the latter and incorporates basic changes. The changes involve the support of the reference element and movement thereof. A liquefied gas, such as liquid helium, is employed and the reference element is rotated. The benefits from using liquid helium include: (1) it renders the viscosity of the supporting fluid low enough to make use of an ultrasonic motor for spinning the reference element; (2) it utilizes the superfluid properties of He II for virtually complete decoupling of the spin from the angular motion of the sound generator; and (3) it eliminates the problem of free convection of fluid when subject to an acceleration field in the presence of a thermal gradient.

In accordance with the present invention, the generation of an acoustic sound supporting field and a pickoff system are substantially as described in the above patent. However, the spherically symmetrical system is mounted in a small cryostat unit.

The disclosure of U.S. Pat. No. 3,232,120 is incorporated herein by reference. With that disclosure in mind, reference may now be had to FIG. 1, wherein the spherical ultrasonic generator 10 within a support 9 encompasses a reference element 11. The reference element 11 includes a quartz reflector shell 12, an ultrasound absorbing shell 13, and a buoyant shell 14. A pair of diametrically opposed diffraction disks 15 and 16 are mounted within the reflection shell 12. A capillary hole 17 extends through the reference element on a line passing through the center thereof. The center 18 of the reference element 11 is hollow. The pickoff units 19 and 20 are generally the same as shown in the above patent. In the above patent, however, the pickoff units are arranged to sense rotation about an axis parallel to their position, whereas in the present system they sense rotation about an axis 90° to their placement.

The volume of the sound generator 10 not occupied by the reference element 11 is filled with a liquefied gas, preferably liquid helium. The liquid helium serves as an acoustic transmission medium so that the sound field generated by the generator 10 will serve to support the reference element 11 within the generator 10. Rotation of the body on which the generator 10 is mounted relative to the reference element 11 may then be sensed by the pickoff unit 19–20.

Disks 15 and 16 are so oriented in reference to the element 11 that the reference element 11 is caused to spin on an axis coinciding with the capillary 17. The reference element 11 is rotated in order to generate about 1,000 c.g.s. units (g—cm²/s ec) of angular momentum. Preferably, the reference element 11 rotates at a speed of about 600 r.p.m. When this is the case, the acceleration term in the equation of motion for the reference element in inertial space, will be of the order of 0.01 degrees per hour. Thus, an extremely stable reference element is provided for measurement of the rotation of the body on which the sound generator 10 is mounted.

While the field generator for support of the reference element 11 operates in the manner disclosed in U.S. Pat. No. 3,232,120, the pickoffs 19 and 20 function the same except that alternating voltages are produced as the reference element 11 spins. In the present invention, only two degrees of freedom are available for angular readout of the position of the ultrasonic generator 10 relative to the reference element 11. The readout on the spin axis is employed only for purpose of control of the spin of the reference element 11.

Figure 2:
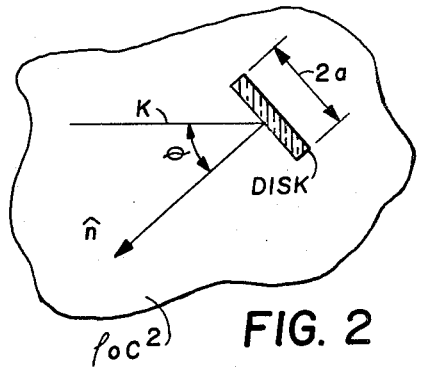

The operation of the system may be understood by referring to FIG. 2, noting that when a disk is placed in a sound field in general it experiences both force and torque. For a circular disk of radius $a$, the torque ($\tau$) produced by a plane wave can be shown to be:

$$\tau = \frac{-P_0^2 a^3}{\rho_0 C^2 (ka)^2 [\sin\theta]^{1/2}} \left[ \frac{\cos [2ka (1 + \sin\theta)]}{[1 + \sin\theta]^{1/2}} + \frac{\sin [2ka (1 - \sin\theta)]}{(1 - \sin\theta)^{1/2}} \right]$$

where:

$P_0$ is the undisturbed pressure in the liquid in sphere 10;
$\rho 0$ is the undisturbed density in such liquid;
$C$ is the phase velocity of sound generated by the sphere 10;
$a$ is the radius of disk 15;
$\theta$ is the angle between a radius in the reference element 11 and a line extending normal to the face of disk 15;
$k$ is the magnitude of the force vector; and
$ka$ is the product of the force vector magnitude and the disc radius, i.e., the radian argument for the pressure, forces, and torque of the field.

A similar result holds for spherical waves, provided the curvature is large compared to $2a$, i.e., provided the disk is small.

Figure 3:
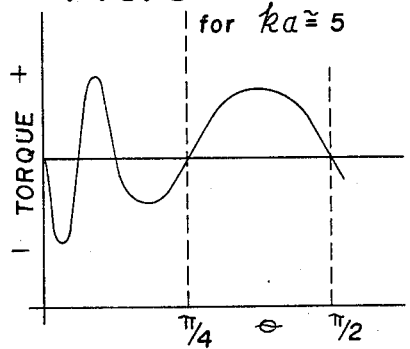
FIG. 3 illustrates variations in torque with the angle of the diffraction disk.
Figure 4:
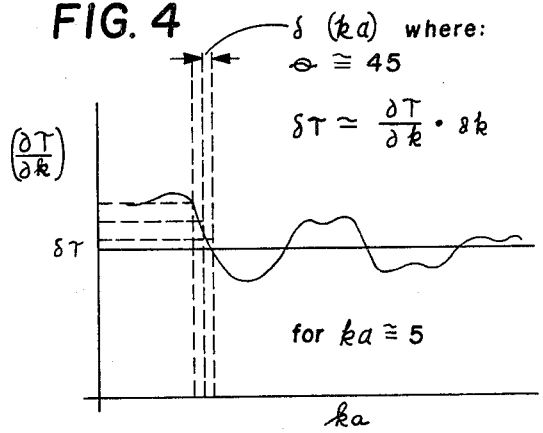
FIG. 4 illustrates the change in torque as a function of the product of the force magnitude and disk radius.

The torque is employed in producing rotation of element 11. Qualitatively, FIG. 3 illustrates a typical torque function with angles for which $d\tau/d\theta<0$ are stable and FIG. 4 illustrates the relationship between the force (F) and torque ($\tau$).

The diffraction torque of the field produced by the generator 10 is utilized as a motor. For an inertial instrument, it is essential that a constant angular velocity of the rotor be maintained.

As shown in FIG. 1, several disks are preferably formed as a part of the rotor element 11. There is an angle of incidence, $\theta$, for which the torque is zero for the carrier frequency of the support radiation field. As seen in FIG. 4, a very slight frequency change produces a torque, the sign of which depends upon the direction of frequency change. For this reason, frequency of the voltage applied to the generator 10 is modulated in proportion to the variation of the spin frequency to maintain rotation of the element 11 constant.

Figure 6:
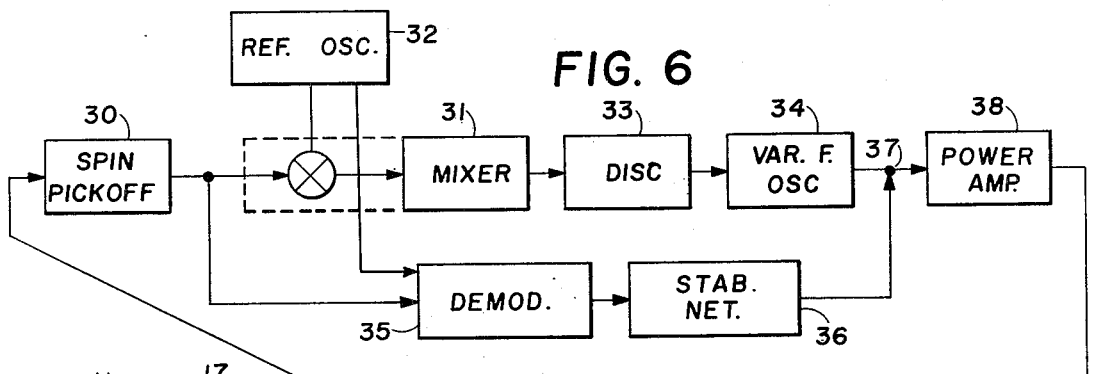
FIG. 6 is a block diagram of a system for controlling rotation of the reference element 11.

The servo system is shown in FIG. 6. The action of the servo is to provide a constant rotational speed ($\omega_s$). The torques need be of only small magnitude, of the order of 0.1 dyne-cm. In effect, the system forms a "synchronous ultrasonic motor."

The low viscosity of He II permits the operation of such a motor. Although the motor torques are small (of the order of 0.1 dyne-cm), the viscosity of liquid He II (helium below the $\lambda$ point of about 2° K) drops to $1.5 \times 10^{-5}$ poise at 1.5° K. A 1 cm inertial element would then develop a viscous torque of about 0.02 dyne-cm at a speed of 60 rad./sec.

The significant physical properties of He II at 1.5° K are as follows:

| | |
|---|---|
| % momentum condensation: | ≈ 95% [i.e., 95% of the fluid mass has zero viscosity.] |
| density: | $\rho = 0.143$ [gm/cm$^3$] |
| velocity of normal sound: | $v_1 = 2.5 \times 10^4$ [cm/sec] |
| velocity of second sound: | $v_2 = 2.0 \times 10^3$ [cm/sec] |
| viscosity: | $\eta = 1.5 \times 10^{-5}$ poise [(dyne/sec)/cm$^2$] |
| $\lambda$ point: | $T\lambda = 2.186°$ K |
| thermal conductivity: | 1,000 times that of pure copper at room temperature or about 1,000 cal./sec through 1 cm$^2$ of He II 1 cm thick for a temperature gradient of 1° C/cm. |

The high value of the conductivity makes it extremely difficult to maintain uniform gradients in the 0.000001° cm range with input heat currents of milliwatts/cm$^2$. Actually, He II is not a classical fluid and has a non-linear conductivity, and experimentally it is found to have a measured gradient of zero with heat current below about 0.1 watt/cm$^2$.

When the superfluid has a relative boundary velocity in excess of about 10 cm/sec (sometimes 1–70 cm/sec), it acquires angular momentum along the spin axis in units of momentum ($h^-$). These are quantum vortex lines and are non-dissipative. The fluid is, however, strongly stabilized against any form of thermal convective motion.

The foregoing indicates the basis for eliminating the problem of free convection. Compared with fluids having heat conductivity corresponding with that of water (or 0.0014 cal./sec), the present system is about one million times better as to that factor. Using He II, the gradient is lowered by $1:1 \times 10^6$, to an entirely negligable range.

The element must be balanced such that the center of gravity and center of mass coincide. However, where the angular momentum is about $5 \times 10^3$ c.g.s. units (g–cm$^2$)/sec and the uncorrected drift rate under a field of 1 g. from this is about 0.01°/hour, balancing is not as critical as the system of U.S. Pat. No. 3,232,120. The random drift after correction is of the order of <0.00001°/hour.

The actual pressure field $P_r$ for the support system in a convergent field with reflective boundary conditions is as follows:

$$P_r = \frac{P_0^2}{2\rho_0 C^2}\left[\frac{kr_2(kr_1 \sin kr_1 + \cos kr_1) + kr_2(kr_1 \cos kr_1 - \sin kr_1)\frac{\cos(kr)}{\sin(kr)}}{kr_1 \cos k(r_2 - r_1) + \sin k(r_2 - r_1)}\right]^2 \frac{\sin^2(kr)}{(kr)^2}$$

where:

$P_r$ is the time average radiation pressure as a function of the radius; $P_o$ is the undisturbed pressure in the liquid in sphere 10;
$\rho 0$ is the undisturbed density in such liquid;
$C$ is the phase velocity of sound generated by the sphere 10;
$k$ is the magnitude of the force vector;
$r_1$ is the radius of the reflecting surface of element 11; and
$r_2$ is the inside radius of the driving shell 10.
$r$ is the variable radial coordinate between radius $r_1$ and radius $r_2$.

Figure 5:
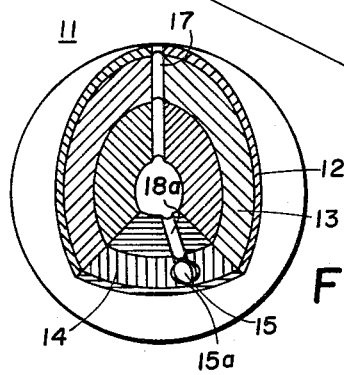
FIG. 5 is a more detailed sectional view of the structure of the reference element.

In FIG. 5, a representative embodiment of the inertial element has been illustrated with one-eighth of the sphere cut away. The reflecting shell 12 may be made of quartz of thickness of approximately 0.2 cm. The intermediate ultrasonic absorber shell 13 may be of spun quartz with a thickness of about 0.3 cm. The cavity 15a in which the disk 15 is located is about 0.2 cm in diameter with the disk 15 slightly smaller than the cavity 15a and mounted therein for liquid flow therearound. A secondary capillary 18a extends radially from the central cavity 18 to the cavity 15a so that the cavity 15a will be loaded with liquid when the element is placed in operation. The system is evacuated before liquid gas is introduced therein so that the liquid gas may enter the central cavity 18 by way of the primary capillary 17. All the remaining volume of the element 11 except for the spherical cavity 18 will be occupied by a buoyant inner shell 14 which may also be made of vacuum spun quartz. The shell 14 may have a thickness of from 0.15 to 0.2 cm and preferably will have a density of about 0.5 grams per cm$^3$. The capillary 17 may be of the order of 0.004 cm in diameter to 0.015 cm in diameter. The secondary capillary 18a may be of the order of 0.004 cm in diameter.

In FIG. 5, only one disk 15 has been shown but it will be understood that at least one additional disk will be mounted in a second cavity diametrically opposite cavity 15a. Disks 15 and 16 will be of quartz cut on an axis different than the quartz of the shell 13, or it may be of solid fused quartz.

The reference element of FIG. 5 may be based upon the following parameters:
outside radius ($r_1$) of element 11 = 1 cm
inside radius ($r_2$) of transducer = 1.3 cm
diffraction disk radius ($a$) = 0.1 cm
drive frequency ≅ 300 KC/sec.
diffraction angle $\theta \cong 45°$
frequency (or phase) modulation < one-third percent
operating temperature ≈ near 1.5° K.
spin angular velocity ≈ near 10 rev./sec.
angular momentum ≈ near $5 \times 10^3$ c.g.s. units.

FIG. 6 illustrates a spin control system. The spin pickoff unit 30 applies an A.C. signal produced by operation of the pickoff units 19 and 20 to mixer 31 along with a signal from reference oscillator 32. The output of the mixer 31 is applied to a discriminator 33 which controls a variable frequency oscillator 34. The pickoff signal is also demodulated in a unit 35 and applied by way of a stabilizing network 36 to a summation point 37. The stabilizing network 36 supplies rate information along with the output of oscillator 34 to the power amplifier 38. The output of the amplifier 38 is applied to the ultrasonic generator shell 10. The block 40 represents the transformation in the system of the pressure P into a torque on the reference element 11. The block 41 represents the transfer function of the torque responsive element including the disks 15 and 16 for converting the torque into rotation of the element 11. This transfer function may be represented by a double integral of the torque divided by the inertia of the element 11. By use of this servo loop, the speed of rotation of element 11 may be controlled.

Having described the invention in connection with certain specific embodiments thereof, it is to be understood that further modifications may now suggest themselves to those skilled in the art and it is intended to cover such modifications as fall within the scope of the appended claims.

What is claimed is:

1. In an inertial reference system where a piezoelectric body mounted within a support has a spherical cavity therein and is energized to establish an accoustical wave field to support a spherical reference element within said cavity and includes means for sensing rotational motion of the support for said body, the combination which comprises:
   a. liquefied gas forming the accoustical wave transmitting medium within said body, and
   b. a cryostat unit for maintaining said system at a cryogenic temperature.

2. The combination set forth in claim 1 in which at least two diffraction disks are mounted in said element diametrically opposed and at angles of about 45° to the diameter for producing a rotational torque in said reference element.

3. The combination set forth in claim 2 in which a servo means including rotation sensing means on an axis perpendicular to said diameter maintain substantially constant the rotational speed of said element.

4. The combination set forth in claim 1 in which said liquefied gas is He II.

5. The combination set forth in claim 1 in which the element has a hollow center with a reflector shell encompassing an ultrasonic absorbent shell in which at least one pair of torque disks are mounted and in which a capillary extends radially from the center of said element.

6. A reference element for an inertial reference system which element is to be positioned in a cavity in a piezoelectric body which produces ultrasonic force fields in a liquefied gas transmission medium therein which comprises:
   a. a hollow multilayer optically active sphere having an outer reflector shell, an intermediate sound absorber shell and an inner buoyant shell with densities graded such that the element is slightly buoyant in said liquefied gas with a central hollow spherical cavity having primary capillaries extending from said central cavity along a first diameter through the exterior surface and having at least two opposed spherical cavities located in said absorber shell on a second diameter perpendicular to said first diameter and each converted to said central cavity by a radial secondary capillary, and
   b. a disk in each of said cavities oriented parallel to a plane which includes said primary capillaries but which is oriented about 45° relative to the axis of the secondary capillaries for converting said force fields into torque on said element.

* * * * *